(12) United States Patent
Cormier et al.

(10) Patent No.: US 7,125,222 B2
(45) Date of Patent: Oct. 24, 2006

(54) GAS TURBINE ENGINE VARIABLE VANE ASSEMBLY

(75) Inventors: Nathan Gerard Cormier, Cincinnati, OH (US); Wayne Ray Bowen, West Chester, OH (US); James Edwin Rhoda, Mason, OH (US); Mitchell Jay Headley, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 10/823,933

(22) Filed: Apr. 14, 2004

(65) Prior Publication Data

US 2005/0232756 A1 Oct. 20, 2005

(51) Int. Cl.
*F01D 17/12* (2006.01)

(52) U.S. Cl. .................... 415/160; 415/170.1; 384/295; 403/319

(58) Field of Classification Search ................ 415/159, 415/160, 161, 162, 229, 170.1, 29; 384/295; 403/319, 320, 316
See application file for complete search history.

(56) References Cited

U.S. PATENT DOCUMENTS

| 4,498,790 A * | 2/1985 | Fisher .................... 384/428 |
| 4,792,277 A * | 12/1988 | Dittberner et al. .......... 415/160 |
| 5,492,446 A | 2/1996 | Hawkins et al. |
| 5,622,473 A | 4/1997 | Payling |
| 5,807,072 A | 9/1998 | Payling |
| 6,019,574 A | 2/2000 | DiBella |
| 6,129,512 A * | 10/2000 | Agram et al. ................ 415/160 |
| 6,209,198 B1 | 4/2001 | Lammas et al. |
| 6,474,941 B1 | 11/2002 | Dingwell et al. |
| 6,682,299 B1 | 1/2004 | Bowen et al. |
| 6,843,638 B1 * | 1/2005 | Hidalgo et al. .......... 415/209.3 |

* cited by examiner

*Primary Examiner*—Edward K. Look
*Assistant Examiner*—Nathan Wiehe
(74) *Attorney, Agent, or Firm*—William Scott Andes; Armstrong Teasdale LLP

(57) ABSTRACT

A method facilitates assembling a variable vane assembly for a gas turbine engine including a casing and an inner shroud. The method comprises providing at least one variable vane including a radially inner spindle that includes a groove defined therein that has at least one machined face, and coupling the variable vane radially between the casing and the inner shroud such that at least a portion of the radially inner spindle is inserted at least partially through an opening extending radially through the inner shroud. The method also comprises securing the variable vane to the inner shroud by engaging the spindle machined face with a retainer coupled to the inner shroud.

17 Claims, 4 Drawing Sheets

GAS TURBINE ENGINE VARIABLE VANE ASSEMBLY

BACKGROUND OF THE INVENTION

This invention relates generally to gas turbine engines, and more specifically to variable stator vane assemblies used with gas turbine engines.

At least some known gas turbine engines include a core engine having, in serial flow arrangement, a fan assembly and a high pressure compressor which compress airflow entering the engine, a combustor which burns a mixture of fuel and air, and low and high pressure turbines which each include a plurality of rotor blades that extract rotational energy from airflow exiting the combustor. At least some known rotor assemblies, such as a high pressure compressors', include a plurality of rows of circumferentially spaced rotor blades, wherein adjacent rows of rotor blades are separated by rows of variable stator vane (VSV) assemblies. More specifically, a plurality of variable stator vane assemblies are secured to casing extending around the rotor assembly and wherein each row of VSV assemblies includes a plurality of circumferentially spaced variable vanes. The orientation of each row of vanes relative to the rotor blades is variable to control airflow through the rotor assembly.

At least one known variable stator vane assembly includes a trunnion bushing that is partially positioned around a portion of a variable vane so that the variable vane extends through the trunnion bushing. Each variable vane is coupled radially between the casing and the inner shroud such that the trunnion bushing extends between the casing and a radially outer spindle extending from the vane, and such that an inner bushing extends between the inner shroud and a radially inner spindle extending from the vane. More specifically, and with respect to the radially inner side of the variable vane, the inner shroud is retained to the VSV's by a plurality of cylindrical pins extending through a respective hole formed in the inner shroud and into a matching cylindrical groove formed along the radial inner spindle and the inner bushing. Accordingly, only line-to-line contact is established between each pin and each vane, and as such, to prevent the inner shroud from rotating with respect to the variable vanes coupled thereto, two pins must be used per shroud.

Over time, because only line-to-line sealing is defined between each pin and each variable vane, wear between the pins and variable vanes may cause possible gas leakage paths to develop within the VSV assembly. Such leakage may result in failure of the bushing due to oxidation and erosion caused by high velocity high temperature air. Furthermore, once the bushing fails, an increase in leakage past the variable vane occurs, which results in a corresponding rotor performance loss. In addition, the loss of the bushing allows contact between the vane and the casing and/or inner shroud which may cause wear and increase the engine overhaul costs.

BRIEF SUMMARY OF THE INVENTION

In one aspect, a method for assembling a variable vane assembly for a gas turbine engine including a casing and an inner shroud is provided. The method comprises providing at least one variable vane including a radially inner spindle that includes a groove defined therein that has at least one machined face, and coupling the variable vane radially between the casing and the inner shroud such that at least a portion of the radially inner spindle is inserted at least partially through an opening extending radially through the inner shroud. The method also comprises securing the variable vane to the inner shroud by engaging the spindle machined face with a retainer coupled to the inner shroud.

In another aspect, a variable vane assembly for a gas turbine engine including a casing is provided. The variable vane assembly includes a variable vane and a retainer. The variable vane includes a radially inner spindle and a radially outer spindle. The radially inner and outer spindles are configured to rotatably couple the vane within the gas turbine engine. At least one of the radially inner and radially outer spindles includes at least one groove defined therein that includes at least one machined face. The retainer engages the groove at least one machined face to securely couple the variable vane within the gas turbine engine. The retainer is configured to facilitate reducing wear of the variable vane.

In a further aspect, a gas turbine engine is provided. The engine includes a rotor comprising a rotor shaft and a plurality of rows of rotor blades, a casing surrounding the rotor blades, and a variable vane assembly. The variable vane assembly includes at least one row of circumferentially spaced variable vanes and a retainer assembly. The at least one row of variable vanes is rotatably coupled to the casing and extends between an adjacent pair of the plurality of rows of rotor blades. Each of the variable vanes includes a radially inner spindle configured to rotatably couple the vane within the gas turbine engine. Each of the radially inner spindles includes at least one groove defined therein and having at least one machined face, the retainer assembly includes at least one retainer for engaging each spindle groove at least one machined face to securely couple each variable vane within the gas turbine engine. Each retainer is configured to facilitate reducing wear of each of the variable vanes.

BRIEF DESCRIPTION OF THE DRAWINGS

FIG. 1 is schematic illustration of a gas turbine engine;

FIG. 2 is partial schematic view of an exemplary gas turbine engine rotor assembly;

FIG. 3 is an enlarged exploded view of a portion of a variable stator vane assembly shown in FIG. 2; and FIG. 4 is a cross-sectional view of a portion of the variable stator vane assembly shown in FIG. 3 and taken along line 4—4.

DETAILED DESCRIPTION OF THE INVENTION

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is a CF6 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

FIG. 2 is partial enlarged schematic view of a gas turbine engine rotor assembly 30, such as compressor 14. FIG. 3 is an enlarged exploded view of a variable stator vane assembly 44 that may be coupled within rotor assembly 30. FIG.

Figure 1:
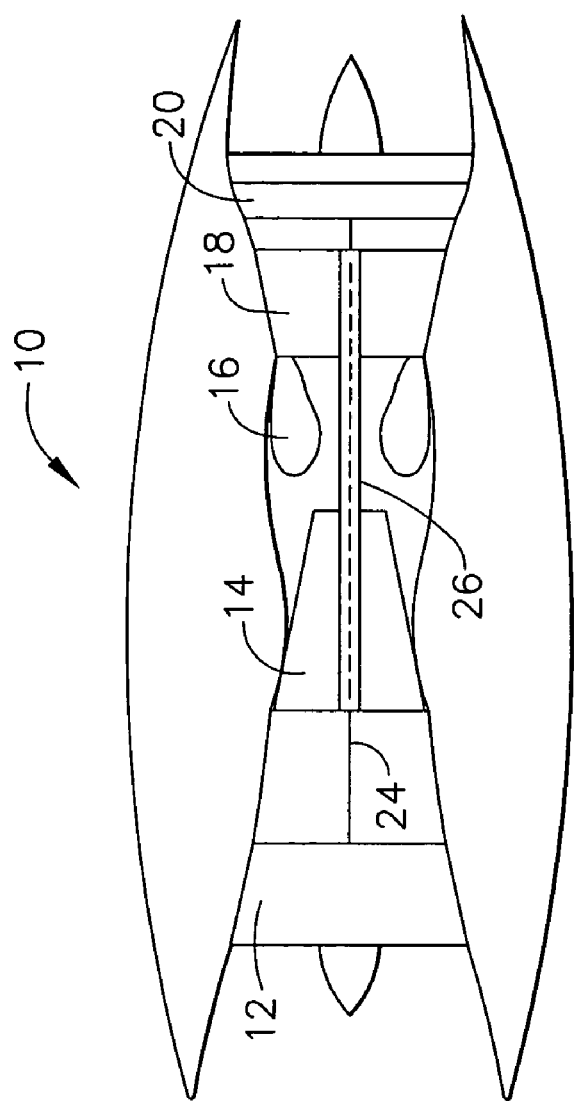
Figure 2:
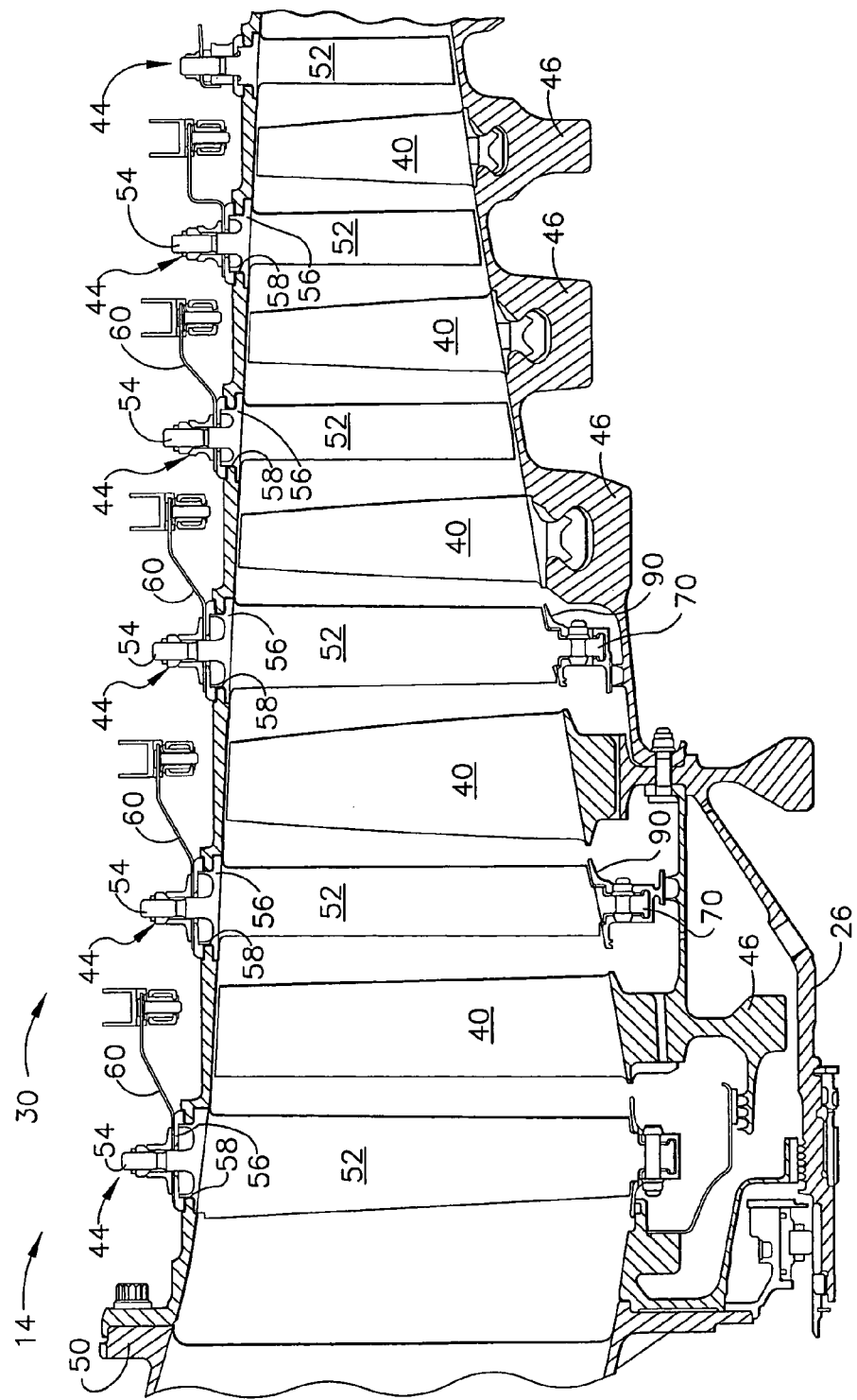
Figure 3:
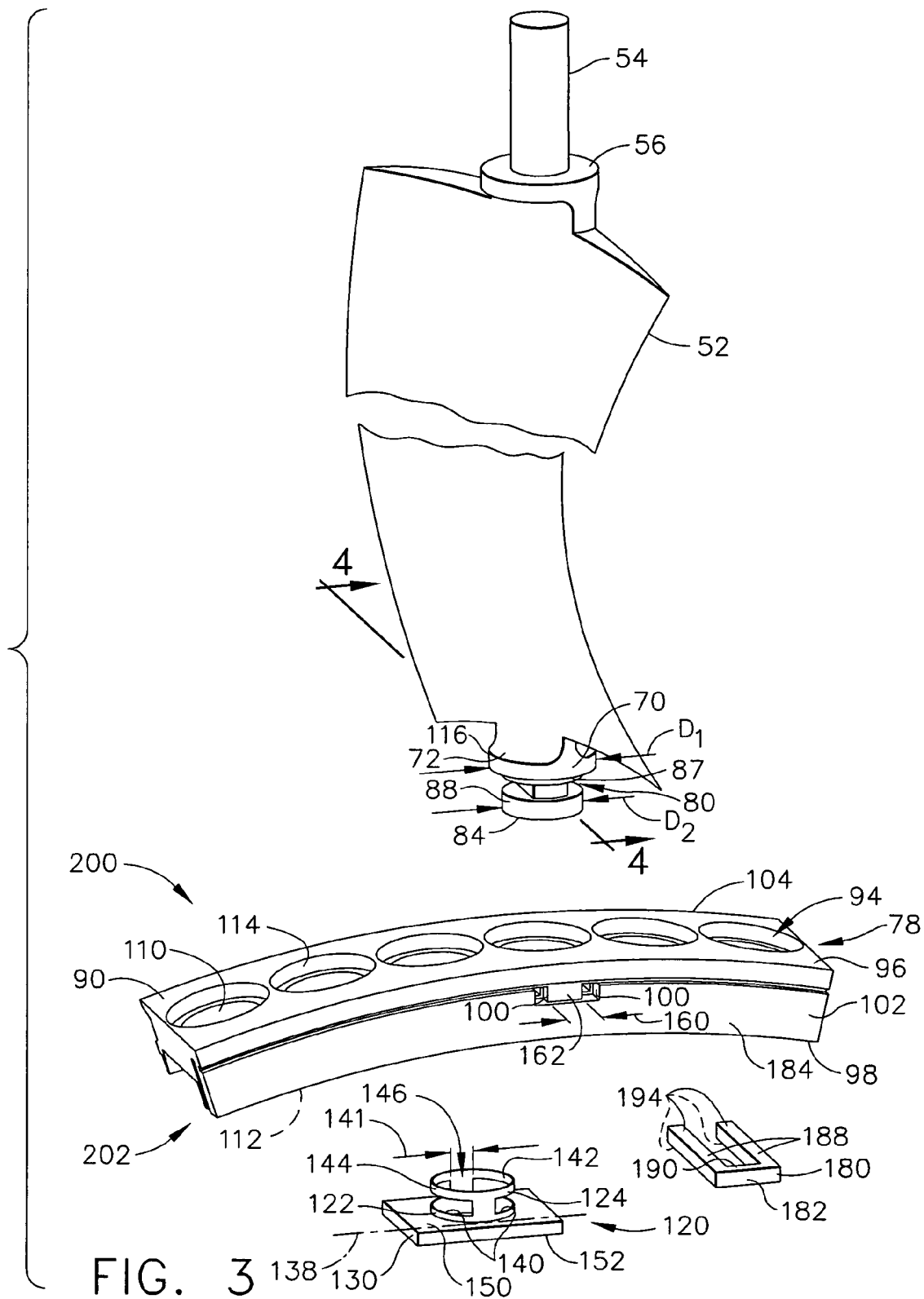
Figure 4:
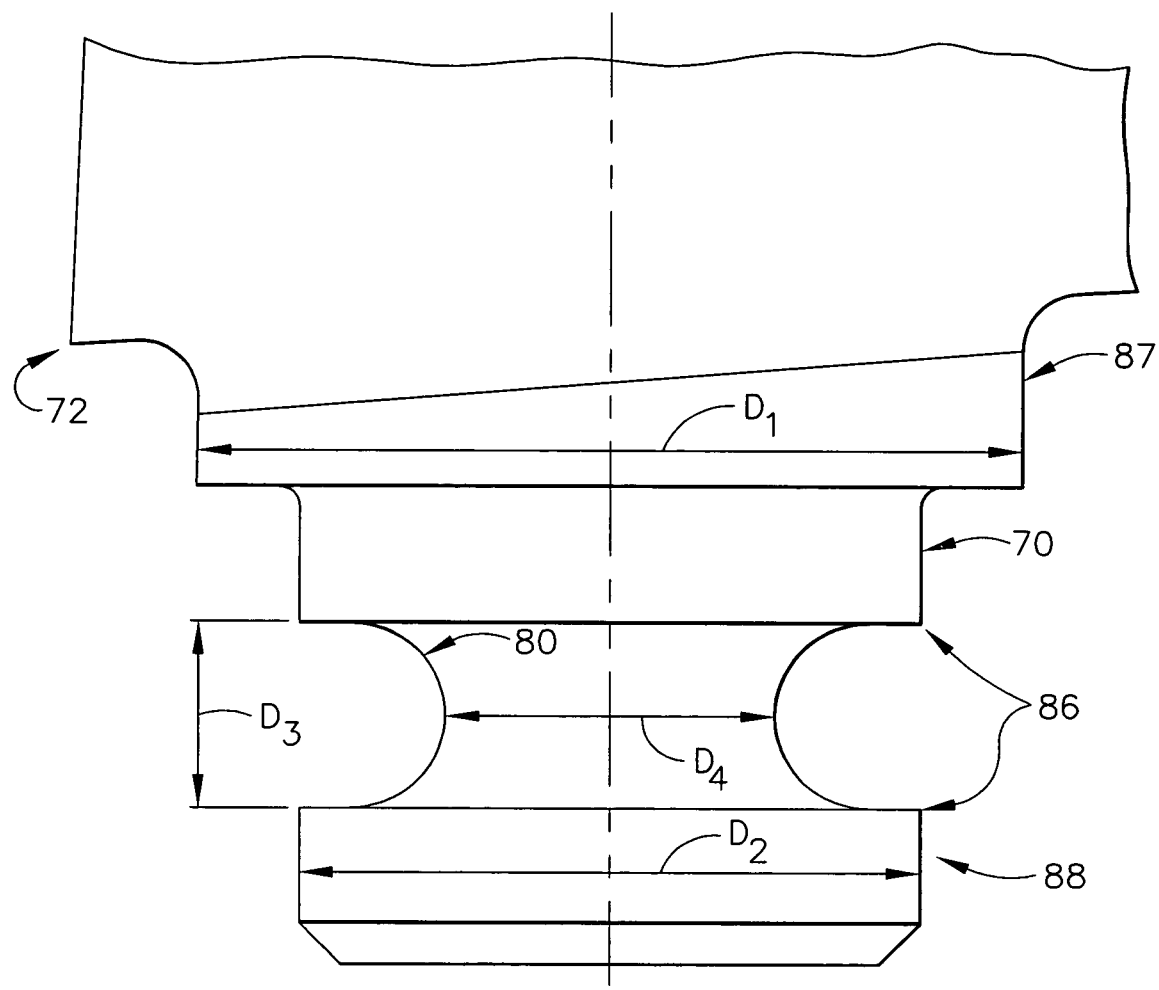

4 is a cross-sectional view of a portion of variable stator vane assembly 44 and taken along line 4—4. Rotor assembly 14 includes a plurality of stages, and each stage includes a row of rotor blades 40 and a row of variable stator vane (VSV) assemblies 44. In the exemplary embodiment, rotor blades 40 are supported by rotor disks 46 and are coupled to rotor shaft 26. Rotor shaft 26 is surrounded by a casing 50 that extends circumferentially around compressor 14 and supports variable stator vane assemblies 44.

Each variable stator vane assembly 44 is a low-boss vane assembly that includes a variable vane 52 that includes a radially outer vane stem or spindle 54 that extends substantially perpendicularly from a vane platform 56. More specifically, vane platform 56 extends between variable vane 52 and spindle 54. Each spindle 54 extends through a respective opening 58 defined in casing 50 to enable variable vane 52 to be coupled to casing 50. Casing 50 includes a plurality of openings 58. A lever arm 60 extends from each variable vane 52 and is utilized to selectively rotate variable vanes 52 for changing an orientation of vanes 52 relative to the flowpath through compressor 14 to facilitate increased control of airflow through compressor 14.

Each variable stator vane 52 also includes a radially inner vane stem or spindle 70 that extends substantially perpendicularly from a radially inward vane platform 72. More specifically, vane platform 72 extends between variable vane 52 and spindle 70, and has an outer diameter $D_1$ that is larger than an outer diameter $D_2$ of spindle 70. As described in more detail below, each spindle 70 extends through a respective opening 94 defined in an inner shroud assembly 78.

A groove 80 is formed within spindle 70 between platform 72 and a radially inner end 84 of spindle 70. Groove 80 extends substantially circumferentially around spindle 70 and includes at least one machined face 86 that is substantially planar. More specifically, in the exemplary embodiment, groove 80 is formed with a pair of machined faces 86 that are opposed and are substantially parallel. Accordingly, groove 80 divides spindle 70 into an intermediate portion 87 that extends between groove 80 and platform 72, and a radially inner portion 88 that extends from groove 80 to radially inner end 84. In the exemplary embodiment, faces 86 are separated by a distance $D_3$ defined by groove 80 which has a diameter $D_4$ that is smaller than spindle outer diameter $D_2$.

In the exemplary embodiment, shroud assembly 78 is formed from a plurality of arcuate shroud segments 90 that abut together such that shroud assembly 78 extends substantially circumferentially within engine 10. In an alternative embodiment, shroud assembly 78 is formed from an annular shroud member. Each shroud segment 90 includes a plurality of circumferentially spaced stem openings 94 that extend radially through shroud segment 90 between a radially outer surface 96 of shroud segment 90 and a radially inner surface 98 of shroud segment 90. Each shroud segment 90 also includes a plurality of circumferentially spaced retainer openings 100 that extend generally axially at least partially through shroud segment 90 from a downstream upstream side 102 of shroud segment 90 towards an upstream side 104 of shroud segment 90.

In the exemplary embodiment, each shroud segment stem opening 94 includes a recessed portion 110, a base portion 112, and a body portion 114 extending therebetween. Recessed portion 110 is sized to receive spindle 70 therethrough such that when platform 72 is received therein, a radial outer surface 116 of platform 72 is substantially flush with shroud radial outer surface 96 when vane 52 is secured to inner shroud assembly 78. Accordingly, recessed portion 110 has a cross-sectional profile that is substantially similar to that of platform 72. In the exemplary embodiment, recessed portion 110 is substantially circular.

Opening body portion 114 extends from recessed portion 110 and is sized to receive spindle 70 therethrough. More specifically, when variable vane 52 is secured to inner shroud assembly 78, at least a portion of an inner bushing 120, described in more detail below, circumscribes spindle portion 70 and more specifically, spindle portion 87. Accordingly, stem opening body portion 114 is sized to receive spindle 70 and a body portion 122 of inner bushing 120 therein. Moreover, stem opening body portion 114 has a cross-sectional profile that is substantially similar to that defined by an external surface 124 of inner bushing body portion 122. In the exemplary embodiment, stem opening body portion 114 has a substantially circular cross-sectional profile.

Opening base portion 112 extends from body portion 114 and is sized to receive at least a portion of spindle 70 therein. More specifically, when variable vane 52 is secured to inner shroud assembly 78 at least a portion of inner bushing 120 circumscribes spindle portion 88. Accordingly, stem opening base portion 112 is sized to receive spindle 70 and a base portion 130 of inner bushing 120 therein. Moreover, stem opening base portion 112 has a cross-sectional profile that is substantially similar to that defined by that of inner bushing base portion 130. In the exemplary embodiment, stem opening base portion 112 has a substantially rectangular cross-sectional profile, and as such, base portion 112 facilitates orienting inner bushing 120 with respect to shroud assembly 78 and variable vane assembly 44.

In the exemplary embodiment, inner bushing 120 is substantially symmetrical about a centerline axis of symmetry 138, and bushing 120 is fabricated from a wear-resistant material that has relatively low wear and frictional properties. In one embodiment, bushing 120 is fabricated from a polyimide material such as, but not limited to, Vespel. In another embodiment, bushing 120 is fabricated from a metallic material. Bushing body portion 122 extends radially outwardly from bushing base portion 130 and includes a pair of substantially parallel slots 140 extending chordwise through body portion 122 and separated by a distance 141. Distance 141 is approximately equal to the diameter $D_4$ defined by groove 80. More specifically, in the exemplary embodiment, body portion 122 has a toroidal cross-section and includes an inner surface 142 and a substantially parallel outer surface 144. Inner surface 142 defines a cavity 146 therein and slots 140 extend across body portion 122 and through cavity 146. In the exemplary embodiment, each slot 142 is identical and is defined by a substantially rectangular cross-sectional profile within body portion surfaces 142 and 144.

Bushing base portion 130 extends from bushing body portion 122 and includes an inner surface 150 and an outer surface 152. In the exemplary embodiment, inner surface 150 is substantially circular and has a diameter (not shown) that is slightly larger than spindle radially outer portion diameter $D_2$. Moreover, in the exemplary embodiment, outer surface 152 is substantially rectangular and defines an outer perimeter that is slightly smaller than that defined by stem opening base portion 112. Accordingly, stem opening base portion 114 facilitates orienting bushing base portion 130, and inner bushing 120 with respect to shroud assembly 78 and vane assembly 44.

Shroud retainer openings 100 extend generally axially into shroud segment 90 from shroud segment downstream side 104 towards shroud segment upstream side 102. In the exemplary embodiment, openings 100 are defined by substantially rectangular cross-sectional profiles that are sized approximately equal to the cross-sectional profiles defined by bushing slots 140. Accordingly, shroud retainer openings 100 are spaced a distance 160 that is approximately equal to slot distance 141. When variable vane 52 is fully coupled to each shroud segment 90, openings 100 and slots 140 are substantially concentrically aligned with respect to each other.

Shroud retainer openings 100 extend inwardly from a recessed portion 162 of shroud segment 90. Shroud segment recessed portion 162 is sized to receive a portion of a retainer 180, described in more detail below, therein, such that when retainer 180 is coupled to shroud segment 90, an outer surface 182 of retainer 180 is substantially flush with an outer surface 184 of shroud downstream side 104.

Retainer 180 includes a pair of retaining arms 188 that are substantially parallel and that extend substantially perpendicularly outward from a retainer base 190. In the exemplary embodiment, each arm 188 is substantially rectangular shaped and includes substantially planar surfaces 194 that are configured to engage spindle machined faces 86.

During assembly of vane assembly 44, initially variable vane radially inner spindle 70 is inserted through a respective shroud segment stem opening 94 from a radially outer side 200 of shroud segment 90 towards a radially inner side 202 of shroud segment 90. When seated within opening 94, vane platform 72 is received within opening recessed portion 110 such that platform radial outer surface 116 is substantially flush with shroud radial outer surface 96. Moreover, when fully seated within opening 94, spindle groove 80 is concentrically aligned with respect to shroud-retainer openings 100.

Inner bushing 120 is then inserted from shroud segment radially inner side 192 into the same segment opening 94 such that bushing 120 extends around vane spindle 70 and between spindle 70 and shroud segment 90. More specifically, when bushing 120 is fully inserted within opening 94, bushing body portion 122 circumscribes spindle intermediate portion 87, and bushing base portion 130 circumscribes spindle outer portion 88. Moreover, when fully seated within opening 94, bushing slots 140 are concentrically aligned with respect to shroud retainer openings 100.

Retainer 180 is then slidably coupled within shroud segment retainer openings 100 to secure bushing 120 and shroud segment 90 to vane 52. More specifically, when fully seated within openings 100, retainer arms 188 each extend through bushing slots 140 and engage groove machined faces 86 on both sides of spindle 70. Accordingly, contact is created between a pair of substantially planar surfaces along each side of vane spindle 70 which facilitates reducing rotation of shroud segment 90 with respect to vane 52. As such, vane 52 is essentially captured within retainer arms 188 such that lateral motion of vane 52 is facilitated to be reduced during engine operation. Moreover, the forked retainer design results in a radially shorter shroud that has a smaller area for pressure loads to act on, and therefore facilitates reducing a bending moment induced to outer spindle 54. As such, wear between retainer 180 and vane 52 is facilitated to be reduced, thus extending a useful life of vane assembly 44.

During operation, retainer 180 facilitates securing bushing 120 in position to reduce air leakage between vane spindle 70 and shroud assembly 78, and such that variable vane 52 and shroud segment 90 are separated with a low friction surface. Radial clamping between retainer 180 and spindle machined faces 86 facilitates reducing relative rotation of inner shroud segments 90 with respect to variable vanes 52. As a result, engine overhaul costs will be facilitated to be reduced.

The above-described variable vane assemblies are cost-effective and highly reliable. The VSV assembly includes a variable vane that includes a spindle having substantially planar machined faces defined thereon. The VSV assembly also includes a retainer that couples through the inner shroud segments in such a manner that retaining contact is created along the pair of machined faces and along opposite sides of the spindle, rather than being created only with line-to-line contact. Accordingly, wear generated between the retainer and the vane is reduced. As a result, the retainer design facilitates extending a useful life of the VSV assembly in a cost-effective and reliable manner.

Exemplary embodiments of VSV assemblies are described above in detail. The systems are not limited to the specific embodiments described herein, but rather, components of each assembly may be utilized independently and separately from other components described herein. Each retainer component can also be used in combination with other VSV components and with other configurations of VSV assemblies.

While the invention has been described in terms of various specific embodiments, those skilled in the art will recognize that the invention can be practiced with modification within the spirit and scope of the claims.

What is claimed is:

1. A method for assembling a variable vane assembly for a gas turbine engine including a casing and an inner shroud, said method comprising:

providing at least one variable vane including a radially inner spindle that includes a groove defined circumferentially therein that has at least one machined face;

coupling the variable vane radially between the casing and the inner shroud such that at least a portion of the radially inner spindle is inserted at least partially through an opening extending radially through the inner shroud;

coupling a bushing around at least a portion of the variable vane radially inner spindle; and securing the variable vane to the inner shroud by engaging the spindle machined face with a retainer coupled to the inner shroud such that at least a portion of the retainer extends through a portion of the bushing.

2. A method in accordance with claim 1 wherein securing the variable vane to the inner shroud by engaging the spindle machined face with a retainer further comprises coupling the retainer to the inner shroud to facilitate preventing rotation of the inner shroud with respect to the variable vane.

3. A method in accordance with claim 1 wherein coupling a bushing further comprises coupling a bushing including a base and a body extending radially from the base to the inner shroud and the variable vane such that the bushing body extends substantially circumferentially around at least a portion of the variable vane radially inner spindle, and wherein the bushing base has a different cross-sectional profile than that of the bushing body.

4. A method in accordance with claim 1 wherein at least a portion of the inner shroud opening has a cross-sectional profile that is substantially similar to that of the bushing base and wherein a portion of the inner shroud opening has a cross-sectional profile that is substantially similar to that of the bushing body, wherein coupling a bushing around at least a portion of the variable vane further comprises inserting the bushing within the inner shroud opening to facilitate preventing rotation of the bushing with respect to the variable vane.

5. A method in accordance with claim 1 wherein securing the variable vane to the inner shroud by engaging the spindle machined face with a retainer further comprises inserting the retainer at least partially through an opening that extends axially at least partially through the inner shroud.

6. A variable vane assembly for a gas turbine engine including a casing, said variable vane assembly comprising:
   a variable vane comprising a radially inner spindle and a radially outer spindle, said radially inner and outer spindles configured to rotatably couple said vane within the gas turbine engine, at least one of said radially inner and radially outer spindles comprises at least one groove defined therein, said at least one groove comprising at least one machined face;
   a bushing extending circumferentially around at least a portion of said radially inner spindle; and
   a retainer for engaging said groove at least one machined face to securely couple said variable vane within the gas turbine engine, said retainer is configured to facilitate reducing wear of said variable vane, said retainer is further configured to contact at least two opposing sides of said variable vane, at least a portion of said retainer extends through a portion of said bushing.

7. A variable vane assembly in accordance with claim 6 wherein said bushing comprises a body and a base extending from said body and configured to facilitate preventing rotation of said bushing with respect to the variable vane.

8. A variable vane assembly in accordance with claim 7 wherein said bushing base has a cross-sectional profile that is different than a cross-sectional profile of said bushing body.

9. A variable vane assembly in accordance with claim 6 wherein said retainer comprises a pair of opposed arms, each said arm configured to engage at least one machined face.

10. A variable vane assembly in accordance with claim 6 wherein said retainer comprises a pair of opposed arms, at least one of said radially inner and radially outer spindles comprises a pair of opposed machined faces, each said arm configured to engage a respective one of said opposed machined faces such that said vane spindle is retained between said pair of opposed arms.

11. A variable vane assembly in accordance with claim 6 wherein said retainer engages a groove defined on said radially inner spindle, said retainer configured to facilitate reducing bending moments induced to said radially outer spindle.

12. A gas turbine engine comprising:
   a rotor comprising a rotor shaft and a plurality of rows of rotor blades;
   a casing surrounding said rotor blades; and
   a variable vane assembly comprising at least one row of circumferentially spaced variable vanes and a retainer assembly, said at least one row of variable vanes rotatably coupled to said casing and extending between an adjacent pair of said plurality of rows of rotor blades, each said variable vane comprising a radially inner spindle configured to rotatably couple said vane within said gas turbine engine and at least one bushing, each of said radially inner spindles comprises at least one groove defined therein and comprising at least one machined face, said at least one groove extends circumferentially within each of said radially inner spindles, said retainer assembly comprising at least one retainer for engaging each said spindle groove at least one machined face to securely couple each said variable vane within said gas turbine engine, wherein at least a portion of said at least one retainer extends through said vane assembly at least one bushing, each said retainer is configured to facilitate reducing wear of each of said variable vanes.

13. A gas turbine engine in accordance with claim 12 further comprising an inner shroud extending substantially circumferentially between an adjacent pair of said plurality of rows of rotor blades, each said variable vane rotatably coupled between said casing and said inner shroud, said at least one retainer extends through a portion of said inner shroud.

14. A gas turbine in accordance with claim 13 wherein said at least one bushing extends around each of said radially inner spindles, said at least one bushing comprising a base and a body extending from said base, said base configured to prevent rotation of said inner shroud with respect to said variable vane assembly.

15. A gas turbine engine in accordance with claim 14 wherein said bushing base has a cross-sectional profile that is different than a cross-sectional profile of said bushing body, said inner shroud comprises a plurality of circumferentially spaced openings extending therethrough, a portion of each of said openings has a cross-sectional shape that is substantially identical to that of said bushing base.

16. A gas turbine engine in accordance with claim 13 wherein said inner shroud comprises a plurality of circumferentially spaced stem openings and a plurality of circumferentially spaced retainer openings, said plurality of stem openings extending substantially radially through said inner shroud, each of said stem openings is sized to receive a portion of said radially inner spindle therein, said plurality of retainer openings extending at least partially substantially axially through said inner shroud, each of said retainer openings is sized to receive at least a portion of said at least one retainer therein.

17. A gas turbine engine in accordance with claim 13 wherein each said radially inner spindle groove comprises a pair of opposed machined faces, each said face is substantially planar, said at least one retainer comprises a pair of opposed arms configured to engage each said groove face such that said radially inner spindle is retained between said retainer arms.

* * * * *